United States Patent Office 3,577,353
Patented May 4, 1971

3,577,353
PREPARATION OF A COGELLED CATALYST OF ALUMINA AND A GROUP VI HYDROGENATING COMPONENT
Robert J. White, Pinole, Calif., assignor to Chevron Research Company, San Francisco, Calif.
No Drawing. Filed Nov. 22, 1968, Ser. No. 778,332
Int. Cl. B01j *11/34, 11/40*
U.S. Cl. 252—465      2 Claims

ABSTRACT OF THE DISCLOSURE

A hydrofining catalyst is prepared by cogelation of hydrous alumina and a Group VI metal or metal compound, washing said gel to remove occluded salts and then contacting the washed gel with an organic solvent before the gel is dried and calcined. This contacting step, which may be carried out with methanol or ethanol, serves to extract water from the hydrous gel and thus provides less shrinkage of the gel after final drying.

INTRODUCTION

This application relates to catalytic hydrofining catalysts, particularly catalytic hydrodesulfurization catalysts, to their preparation, and to their use in catalytic hydrofining processes, particularly catalytic hydrodesulfurization processes.

PRIOR ART HYDROFINING CATALYSTS, PROCESSES AND PROBLEMS

Catalytic hydrofining catalysts, including catalytic hydrodesulfurization catalysts, in general are well known. Representative of such prior art catalysts are those alumina-containing catalysts consisting of the following combinations of components, with the various hydrogenating components being in the forms of metals or metal compounds:

$$NiMoAl_2O_3$$
$$NiMoAl_2O_3F$$
$$CoMoAl_2O_3$$
$$CoMoAl_2O_3F$$

In various modifications of such prior art catalysts, silica as well as alumina may be present.

The above-described catalysts are known to be effective for catalytic hydrodenitrification and catalytic hydrodesulfurization of hydrocarbon feedstocks, particularly hydrocarbon feedstocks such as vacuum gas oils that do not contain appreciable amounts of heavy residual materials. Hydrofining of the heavier residual feedstocks generally is more concerned with hydrodesulfurization than with hydrodenitrification, because such feedstocks frequently are intended for use as heavy fuels which must have a low sulfur content to conform with air pollution requirements, but which may have an appreciable nitrogen content. To the contrary, lighter feedstocks not containing appreciable amounts of heavy residual materials generally are intended to be supplied to subsequent processing units, such as catalytic hydrocracking units, which contain nitrogen-sensitive but sulfur-tolerant catalysts. Accordingly, hydrodenitrification of such lighter feedstocks frequently is of greater concern than hydrodesulfurization, although generally hydrodesulfurization is accomplished inherently during the necessary hydrodenitrification.

It is known that hydrodesulfurization of feedstocks containing appreciable amounts of heavy residual materials presents problems of a much more severe nature than does hydrofining of lighter feedstocks. Catalysts that are adequate for hydrofining the lighter feedstocks may be entirely inadequate for hydrodesulfurization of heavier stocks. There has been a continuing search for catalysts having improved hydrodesulfurization activities and stabilities in hydrodesulfurization service. A very effective catalyst for this purpose, that recently has been discovered, is described in the copending application of Joseph Jaffe, Ser. No. 743,003, filed July 8, 1968. In one embodiment, the catalyst described in said Jaffe application consists of nickel oxide. molybdenum oxide, titanium phosphate, fluorine and alumina.

Despite recent advances in hydrodesulfurization catalysts, for example the catalyst described in said Jaffe application, there is a continuing need for further improvements, particularly because feedstocks containing appreciable amounts of heavier materials, that must be desulfurized, also contain appreciable amounts of metals, including nickel and vanadium. These metals are particularly detrimental to hydrodesulfurization catalysts, because during the hydrodesulfurization reaction they are caused to deposit on the surface of the catalyst particles, where they form a coating, which eventually blocks off access of the hydrocarbon reactant molecules to the catalytically active sites within the catalyst particles.

The life of hydrofining catalysts, and particularly cogelled residuum hydrodesulfurization catalysts, might be prolonged by controlling the pore structures thereof so that more metals deposition must occur before the catalytically active sites of the catalyst are obscured by metals, than is the case with catalysts heretofore known.

According to recent observations, the structure of gel particles of catalysts generally consists of non-porous globules or spheres, packed together and adhering at their points of contact. In such a structure, the pores are the cavities among the various packed globules. The size and arrangement of the globules determines the specific surface area, the packing density, and the volume and diameter of the pores. The globular structure of gel particles of catalysts starts with a solution-forming step, wherein precursors of the final catalyst components are combined in aqueous solution. Gelation of the solution is caused to occur, creating a hydrogel containing hydrated metal oxides. The transition from a solution into a hydrogel is characterized by aggregation of the non-porous globules or spheres, consisting of the catalytic materials largely in the form of hydrated metal oxides, into a structural network containing a large amount of occluded water. After drying and calcining the hydrogel to convert the hydrated oxides to oxides and to activate the catalyst, the structural network of non-porous globules or spheres remains, as a porous structure called a xerogel.

OPPORTUNITIES FOR VARYING CATALYST PHYSICAL CHARACTERISTICS

In the above-described sequence of proceeding from a solution to a hydrogel to a xerogel, opportunity exists at the solution and hydogel stages for varying the arrangement and dimensions of the globules or spheres, thus accomplishing a change in the specific surface area, packing density, and pore volume and pore diameter of the catalyst particles. Not only does an opportunity exist for varying the arrangement and dimensions of the globules or spheres when they are first formed, but an opportunity exists for stabilizing their size after they are formed, that is, to prevent them from polymerizing with each other into larger-sized globules or spheres, which also would change the specific surface area and pore diameter of the catalyst particles.

As a practical matter, it is more desirable to influence the initial dimensions of the globules or spheres at the hydrogel stage, and obviously any prevention of their polymerization is better accomplished at this stage.

The various globules or spheres in a xerogel generally all are packed uniformly closely together and the pores existing among them generally have pore diameters below about 500 angstroms (A.). Such pores conveniently are referred to as micropores. Because of the nature of the catalytic structure of a given catalyst particle, it is possible that it can be modified so that at least in some portions of the catalyst particles the globules or spheres are not packed uniformly closely together. For example, it is possible that large empty spaces or cracks can be created. Such empty spaces generally will have pore diameters above about 500 A., and are referred to herein as macropores.

CATALYST PHYSICAL CHARACTERISTICS; DEFINITIONS AND METHODS OF MEASUREMENT

At this point it will aid in further understanding the catalyst and process of the present invention to define various physical characteristics of porous catalyst particles (each consisting of a structural network of nonporous globules or spheres of the catalytic components of the catalyst, and contained pores):

(1) Bulk density of a settled bed of catalyst particles= grams of particles per mililiter of bed.
(2) Particle density=grams of particle per cubic centimeter of particle.
(3) Skeletal density=grams of skeleton (i.e., the globules or spheres) per cubic centimeter of skeleton. A typical value for catalyst compositions of the type described herein is about 4 gm./cc.
(4) Weight of particle=grams of particle=grams of skeleton (pores are considered weightless).
(5) Specific micropore volume=cubic centimeters of micropores per gram of particle.
(6) Specific macropore volume=cubic centimeters of macropores per gram of particle.
(7) Specific total pore volume=cubic centimeters of micropores plus macropores per gram of particle.
(8) Specific volume of particle=cubic centimeters of skeleton plus cubic centimeters of pores (macropores and micropores) per gram of particle. Mathematically this can be expressed by the following relation:

$$\frac{1}{\text{particle density}} = \frac{1}{\text{skeletal density}} + \text{specific total pore volume}$$

(9) Surface area=square meters of catalyst surface per gram of catalyst. As a practical matter, the entire surface area may be assumed to be associated with the micropores in a catalyst having both micropores and macropores, because the surface area associated with the macropores is negligible.

(10) Average micropore diameter $$= \frac{\text{Specific micropore volume}}{\text{Surface area per gram}} \times 4 \times 10^4$$

This is based on a model in which pores are assumed to be cylinders, e.g., a catalyst particle having a specific micropore volume of 0.4 cubic centimeter per gram and a surface area of 400 square meters per gram will have an average pore diameter of:

$$\frac{0.4 \text{ cc./g.}}{400 \text{ M}^2/\text{g.}} \times 4 \times 10^4 = 40 \text{ A.}$$

(11) Porosity=cubic centimeters of micropores plus macropores per cubic centimeter of particle=specific total pore volume times particle density.

The various physical characteristics of a catalyst in the above list may be determined in known ways. The specific total pore volume may be determined easily by water absorption or calculated from the particle density and the skeletal density. The specific micropore volume may be determined by gas adsorption and absorption at controlled gas pressure, for example using a Gulf Aminco Adsorptomat apparatus operating with nitrogen. The specific macropore volume may be obtained by difference. The surface area and various densities in the list above may be determined in known ways.

OBJECTS OF PRESENT INVENTION

With the foregoing background, it remains to determine: (1) what chemical and physical characteristics a hydrofining catalyst, and particularly a hydrodesulfurization catalyst, should have for an optimum combination of hydrofining activity and long life, particularly when used to hydrodesulfurize heavy residual hydrocarbon feedstocks with high metals contents; and (2) how such chemical and structural characteristics can be achieved. These matters are covered in the following section, which indicates that the optimum catalysts have novel combinations of chemical and physical characteristics, and therefore that they and their preparation and use represent unique improvements over prior art catalysts and their preparation and use.

STATEMENT OF INVENTION

In accordance with the present invention it has been found that a hydrofining catalyst, and particularly a hydrodesulfurization catalyst, and more particularly a hydrodesulfurization catalyst which is to have initial effectiveness and sustained effectiveness in accomplishing hydrodesulfurization of hydrocarbon feedstocks containing appreciable amounts of heavy residual materials, must have the following unique combination of characteristics:

(1) With respect to chemical characteristics, the catalyst must (a) contain at least 20 weight percent alumina gel, based on the total catalyst; the catalyst also may contain silica, in amounts which may range as high as 20 weight percent and above, based on the total catalyst, but the preferred catalyst is essentially silica-free, that is, it contains less than 3 weight percent, preferably less than 1.5 weight percent, silica, based on the total catalyst,
(b) contain a Group VI component, preferably molybdenum or a compound thereof. The Group VI component should be present in an amount of at least 4 weight percent, preferably 8 to 25 weight percent, based on the total catalyst and calculated as metal. The catalyst also may contain a Group VIII component, preferably nickel or a compound thereof. The preferred combination of the Group VIII component, when that component is present, is 1 to 10 weight percent, based on the total catalyst and calculated as metal.

(2) With respect to physical characteristics, the catalyst must have:

(a) a structure resulting from cogelation of precursors of the alumina gel component and the Group VI component of the catalyst; preferably additional catalyst components present, for example a Group VIII component, also are incorporated in the catalyst by cogelation of precursors thereof with the precursors of the alumina and of the Group VI component,
(b) an average micropore diameter of 60 to 250 A., preferably 90 to 150 A.,
(c) a specific total pore volume of 0.4 to 2.0 cubic centimeters per gram, preferably 0.7 to 1.0 cubic centimeter per gram,
(d) a porosity above 0.75 cubic centimeter per cubic centimeter, and preferably not more than 0.90 cubic centimeter per cubic centimeter, and more preferably not more than 80 cubic centimeters per cubic centimeter, and
(e) a surface area of at least 100 square meters per gram, preferably at least 150 square meters per gram.

The foregoing catalyst characteristics were arrived at by combining various findings not heretofore known or, in some cases, the full significance of which has not been appreciated with respect to efficacy of hydrofining catalysts, and particularly hydrodesulfurization catalysts. More specifically, it has been found that in hydrodesulfurization of hydrocarbon feedstocks containing substantial amounts of heavy residual materials containing metals, particularly nickel and vanadium, the catalyst must have not only the indicated chemical characteristics, but also the indicated physical characteristics. In particular, it has been found that:

(a) cogelation of precursors of the Group VI hydrogenating component and the Group VIII hydrogenating component with precursors of the alumina component in preparation of a hydrofining catalyst comprising said components results in a catalyst that is superior to one prepared by impregnation of the alumina with either or both of said components;

(b) an average micropore diameter as large as possible, consistent with maintaining a reasonable surface area, and of at least 60 A., is critical to the attainment of an initial low fouling rate, because initially the catalyst fouling is largely attributable to coke laydown, which restricts access of reactant molecules to active catalyst sites, and is little influenced by the metals present in the feed;

(c) a specific total pore volume as large as possible, and of at least 0.4 cubic centimeter per gram, is critical to the sustaining of a low catalyst fouling rate and therefore to long catalyst life, because as a given run progresses metal deposits on the catalyst build up rapidly, and a large specific total pore volume is necessary to provide the catalyst with a capacity for holding a maximum amount of metals before the deposited metals form a barrier to screen off a substantial portion of the active catalyst sites from contact with reactant molecules;

(d) the porosity cannot exceed 0.90 cubic centimeter per cubic centimeter, that is, 90% porosity, or the catalyst particles have inadequate physical strength, and must be more than 0.75 cubic centimeter per cubic centimeter if the specific total pore volume requirements are to be met;

(e) a surface area of at least 100 square meters per gram, and preferably at least 150 square meters per gram, is necessary as a practical matter for catalyst efficacy; while surface areas above 150 square meters per gram are contemplated and are desirable, higher surface areas mean lower average micropore diameters because specific total pore volume is fixed, and when the specific macropore volume, if any, is subtracted from the specific total pore volume, the remaining specific micropore volume is a function of the product of the average micropore diameter and the surface area, substantially all of which is associated with the micropores. Accordingly, surface area cannot be increased beyond the point where the average micropore diameter is reduced to 60 A.

Accordingly, in accordance with one embodiment of the present invention there is provided a hydrofining catalyst comprising alumina and a Group VI metal or metal compound hydrogenating component, said catalyst containing (a) alumina gel in an amount of at least 20 weight percent, based on the total catalyst, (b) at least 4 weight percent of said Group VI metal or metal compound hydrogenating component, based on the total catalyst and calculated as metal, said catalyst having (a) a structure resulting from cogelation of precursors of said alumina gel and said Group VI component, (b) an average micropore diameter of 60 to 250 A., (c) a specific total pore volume of 0.4 to 2.0 cubic centimeters per gram, (d) a porosity above 0.75 cubic centimeter per cubic centimeter, and (e) a surface area of at least 100 square meters per gram.

In accordance with additional embodiments of the present invention:

(1) The catalyst of the invention advantageously may contain a Group VIII metal or compound thereof, particularly nickel or cobalt, with nickel being preferred, in an amount of at least 1 weight percent, based on the total catalyst and calculated as metal.

(2) The catalyst of the invention advantageously may contain a Group IV metal or compound thereof, particularly titanium, zirconium, hafnium, thorium or cerium. Titanium or a compound thereof, particularly titania or titanium phosphate, is preferred. Titanium phosphate is especially preferred. When compounds of zirconium, hafnium, thorium or cerium are used, phosphates are preferred. Metal phosphates contribute to a higher porosity, and lower the catalyst fouling rate. When metal phosphates are present, it is preferred that they be present in an amount of 8 to 35 weight percent of the total catalyst. Metal phosphates may be incorporated into the catalyst in the manner set forth in said Jaffe application Ser. No. 743,003.

(3) The catalyst of the present invention advantageously may contain combined fluorine, in an amount of 0.5 to 5 weight percent, based on the final catalyst. The fluorine may be incorporated into the catalyst in any convenient manner that will result in a substantially uniform distribution of combined fluorine through the final catalyst. A preferred manner of incorporating fluorine in the catalyst is by addition of a soluble fluoride compound, for example sodium fluoride, ammonium fluoride, ammonium bifluoride or hydrofluoric acid. The fluoride compound may be combined with the other catalyst components at any of various stages of catalyst preparation. Sufficient excess water should be present to permit achievement of a substantially uniform mutual interspersion of fluorine with the other catalyst components by mixing. The necessary average micropore diameter of at least 60 A. may be achieved at least in part by adding fluorine to the catalyst in amounts sufficient to decrease the surface area at a constant specific micropore volume, but in amounts insufficient to reduce the surface area below the necessary value of at least 100 square meters per gram. High-temperature steaming also will serve to reduce the surface area.

(4) The necessary specific total pore volume of 0.4 to 2.0 cubic centimeters per gram may be achieved by the following procedure, which serves to increase both specific total pore volume and average micropore diameter:

(a) a hydrous gel is formed, comprising precursors of the alumina gel and of the Group VI and Group VIII hydrogenating components, (b) the hydrous gel is washed as necessary, in a conventional manner, in one or more steps which may be separated by drying steps, (c) before the final drying step, the hydrous gel is contacted with an organic solvent. The organic solvent may be any organic compound having a lower surface tension than water. Paraffinic alcohols, particularly lower alcohols such as methanol and ethanol, are preferred. Other suitable compounds include ketones, preferably acetone, and ethers and aldehydes, preferably formaldehyde. The contacting may be accomplished at ambient conditions. The time of contacting may be, for example, 10 minutes to one-half hour. The washed hydrous gel that is contacted may be in any suitable physical form, for example a filter cake or an extrudate. The organic solvent serves to extract water from the hydrous gel, replacing it with the organic solvent having a lower surface tension than the extracted water, so that upon final drying less shrinkage of the gel will occur. Accordingly, no washing step should be used between the organic solvent extraction step and the final drying step. The amount of organic solvent that should be used may be any amount adequate to replace a substantial amount of the water in the hydrous gel. The extraction step conveniently may be accomplished simply by dunking the hydrous gel, or partiles thereof, in a liquid body of the organic solvent. Excellent results have been obtained by dunking 1 volume of washed hydrogel particles in 4 volumes of denatured alcohol for 10 minutes to 30 minutes at room temperature.

(d) the extracted gel is dried and calcined in a conventional manner, to produce the final catalyst.

It will be noted that fluorine addition to the catalyst serves to decrease the surface area at a constant specific micropore volume, which results in an increase in average micropore diameter. It also will be noted that because the organic solvent extraction step discussed in this section serves to increase average micropore diameter as well as specific total pore volume, the organic solvent extraction step may be used to achieve the desired catalyst characteristics without the use of fluorine, when a non-fluorine-containing catalyst is desired.

(5) Catalyst porosity control required to obtain the necessary catalyst porosity of above 0.75 cubic centimeter per cubic centimeter may be achieved by the organic solvent extraction step discussed under 3, immediately above. The organic solvent extraction procedure may be augmented by using the metal phosphates discussed in 1, above, and/or by drying the catalyst in a steam atmosphere, to further control the catalyst porosity.

HYDROFINING PROCESS OPERATION

The hydrofining processes utilizing the catalysts of the present invention may be carried out at conventional hydrofining process conditions, for example at temperatures in the range 500° to 850° F., pressures in the range 200 to 10,000 p.s.i.g., liquid hourly space velocities, based on the hydrocarbon oil feed, in the range 0.2 to 10, and at total hydrogen rates of 500 to 20,000 s.c.f. of $H_2$ per barrel of hydrocarbon oil feed. A hydrodesulfurization process conducted under these conditions with the catalyst of the present invention will effect the removal of a substantial proportion of the sulfur compounds contained in a wide variety of hydrocarbon feedstocks, for example residual hydrocarbon feedstocks as well as hydrocarbon distillates such as cracked naphthas, light cycle oils, coker distillates, and straight-run gas oils.

EXAMPLES

The following examples will aid in further understanding the present invention.

Example 1

Seven catalysts, Catalysts A through G, inclusive, were prepared, having the chemical and physical characteristics indicated in the following Table I. Catalysts C, E and G are catalysts according to the present invention. In each case the catalyst contained alumina, and in each case the alumina constituted the remainder of the catalyst. The asterisks in the table mark catalyst characteristics that do not meet the requirements of the catalyst of the present invention.

TABLE I

| | Claimed catalyst | Catalyst | | | | | | |
|---|---|---|---|---|---|---|---|---|
| | | A | B | C | D | E | F | G |
| Method of preparation | Cogelation | Impregnation | Cogelation | Cogelation | Cogelation | Cogelation | Cogelation | Cogelation |
| Gr. VI, wt. percent as metal | At least 4 | 18 (Mo) | 20 (Mo) | 20 (Mo) | 16 (Mo) | 16 (Mo) | 20 (Mo) | 20 (Mo) |
| Gr. VIII, wt. percent as metal | | 6 (Ni) | 10 (Ni) | 10 (Ni) | 8 (Ni) | 8 (Ni) | 8 (Ni) | 8 (Ni) |
| $SiO_2$, wt. percent | | 14.4 | 0 | 0 | 0 | 0 | 0 | 0 |
| $TiO_2$, wt. percent | | 0 | 0 | 0 | 10 | 10 | 10 | 10 |
| $P_2O_5$, wt. percent | | 0 | 0 | 0 | 5 | 5 | 5 | 5 |
| F, wt. percent | | 0 | 3 | 3 | 0 | 0 | 5 | 5 |
| Average micropore diameter, A | 60 to 250 | 80 | 75 | 109 | 70 | 87 | 79 | 130 |
| Specific total pore volume, cc./g | 0.4 to 2.0 | 0.42 | 0.4 | 0.8 | 0.54 | 0.72 | 0.43 | 0.78 |
| Porosity, cc./cc | Above 0.75 | * 0.695 | * 0.66 | 0.77 | * 0.74 | 0.78 | * 0.66 | 0.76 |
| Surface area, $M^2/g$ | At least 100 | 207 | 215 | 279 | 300 | 332 | 214 | 234 |
| Bulk density, g./cc | | 0.71 | 0.92 | 0.57 | 0.72 | 0.54 | 0.80 | 0.58 |

Example 2

Each of Catalysts A, B, C, E, F and G in Example 1 was separately used to hydrodesulfurize a separate portion of the same 650° F.+Safaniya residual crude hydrocarbon feedstock.

The feedstock had the following characteristics:

Metals content (Ni+Fe+V), p.p.m. _____ 108
Organic sulfur content, wt. percent _____ 4.3
Asphaltene content, wt. percent _____ 11.2
Gravity, ° API _____ 12.9

The process conditions in each case were:

Pressure, p.s.i.g. _____ [1] 1900
Total hydrogen rate, s.c.f./bbl. _____ 5000
Liquid hourly space velocity _____ [2] 1.5
Organic sulfur in product, wt. percent _____ 0.5

[1] Except with Catalyst A the pressure was 2400 p.s.i.g.
[2] Except with Catalyst A the space velocity was 1.0.

The operating temperature in each case was adjusted continuously as necessary to maintain the indicated level of organic sulfur in the product.

The initial temperatures required for the indicated degree of desulfurization, and the catalyst fouling rates—the hourly rates at which it was necessary to raise the temperatures to maintain the indicated degree of desulfurization—are shown in the following Table II.

TABLE II

| Catalyst | Initial temperature, ° F. | Catalyst fouling rate, ° F./hr.[1] |
|---|---|---|
| A | 760 | 0.35 |
| B | 759 | 0.10 |
| C | 740 | 0.10 |
| D | | |
| E | 752 | 0.09 |
| F | 760 | 0.12 |
| G | 758 | 0.12 |

[1] Initial fouling rate, i.e. k fouling rate measured over approximately the first 200 hours of operation.

From Table II it may be seen that Catalysts C, E and G, all catalysts according to the present invention, resulted in lower initial temperatures (i.e., higher initial desulfurization activities) than did comparison Catalysts A, B and F, at catalyst fouling rates as low or lower than those of comparison Catalysts A, B and F.

Example 3

Catalysts F and G in Example 1 were separately used to hydrodesulfurize a separate portion of the same 650° F.+ Safaniya residual crude hydrocarbon feedstock that was used in Example 2.

The process conditions in each case were:

Pressure, p.s.i.g. _____ 1900
Total hydrogen rate, s.c.f./bbl. _____ 5000
Liquid hourly space velocity, v./v./hr. _____ 1.0
Organic sulfur in product, wt. percent _____ 1.0

The operating temperature in each case was adjusted continuously as necessary to maintain the indicated level of organic sulfur in the product.

The initial temperatures required for the indicated degree of desulfurization, and the catalyst fouling rates—the hourly rate at which it was necessary to raise the temperatures to maintain the indicated degree of desulfurization—are shown in the following Table III. Also shown in Table III are the number of hours each catalyst stayed on stream continuously before its fouling rate reached approximately five times its initial fouling rate.

TABLE III

| Catalyst | F | G |
|---|---|---|
| Initial temperature, °F | 715 | 715 |
| Catalyst fouling rate, °F./hr.[1] | 0.03 | 0.03 |
| Hours to 5 times initial FR | 600 | 1,200 |

[1] Initial fouling rate, i.e., fouling rate measured over approximately the first 200 hours of operation.

From Table III it may be seen that Catalyst G, a catalyst according to the present invention, and comparison Catalyst F, each had a comparably high initial activity and low initial fouling rate. However, it also may be seen that Catalyst G had a substantially longer effective life, because after the first few hundred hours on stream the fouling rate of Catalyst F was progressively greater than that of Catalyst G, i.e., the stability of Catalyst G after the first few hundred hours was substantially better than that of Catalyst F.

The activity and fouling rate comparisons in Tables II and III above were made on a volume basis, that is, on the basis of processing a given volume of hydrocarbon feedstock per volume of catalyst per hour. Even on this basis, the superiority of the catalysts of the present invention is evident, both in terms of activity and fouling rate. However, it will be noted from the comparative bulk densities given in Table I that the catalysts of the present invention have generally lower bulk densities than the comparison catalysts. Accordingly, on a weight basis the superiority of the catalysts of the present invention over the comparison catalysts is even more striking. That is, the superior results obtained with the catalysts of the present invention were obtained with a weight of the catalysts that was less than the weight of the comparison catalysts.

Although only specific embodiments of the present invention have been described, numerous variations could be made in those embodiments without departing from the spirit of the invention, and all such variations that fall within the scope of the appended claims are intended to be embraced thereby.

What is claimed is:

1. The method of preparing a hydrofining catalyst comprising alumina and a Group VI metal or metal compound hydrogenating component, which comprises forming a hydrous gel comprising precursors of said alumina gel and of said Group VI hydrogenating component, washing said gel to remove occluded salts, contacting said washed gel wtih an organic solvent having a lower surface tension than water to extract water therefrom, and drying and calcining the extracted gel without any additional washing after said contact with the organic solvent is completed.

2. A process as in claim 1, wherein said organic solvent is an alcohol.

References Cited

UNITED STATES PATENTS

| | | | |
|---|---|---|---|
| 3,074,893 | 1/1963 | Ellert et al. | 252—465 |
| 3,205,165 | 9/1965 | Hilfman | 252—465 |
| 3,227,661 | 1/1966 | Jacobson et al. | 252—465 |
| 3,280,040 | 10/1966 | Jaffe | 252—453 |
| 3,291,751 | 12/1966 | Buss | 252—465 |
| 3,383,301 | 5/1968 | Beuther et al. | 208—216 |
| 3,471,399 | 10/1969 | O'Hara | 208—216 |
| 3,493,517 | 2/1970 | Jaffe | 208—254 |

DELBERT E. GANTZ, Primary Examiner

G. J. CRASANAKIS, Assistant Examiner

U.S. Cl. X.R.

208—216; 252—437, 441